(12) United States Patent
Chen et al.

(10) Patent No.: US 9,640,961 B2
(45) Date of Patent: May 2, 2017

(54) CABLE MANAGEMENT ASSEMBLY

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Shun-Ho Yang, Kaohsiung (TW); Chien-Li Huang, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 0 days.

(21) Appl. No.: 14/607,241

(22) Filed: Jan. 28, 2015

(65) Prior Publication Data
US 2016/0215904 A1 Jul. 28, 2016

(51) Int. Cl.
*F16L 3/22* (2006.01)
*H02G 3/32* (2006.01)

(52) U.S. Cl.
CPC .................................. *H02G 3/32* (2013.01)

(58) Field of Classification Search
CPC ....... H05K 7/1421; H05K 7/1491; F16L 3/01; F16L 3/02; F16L 3/06; F16L 3/015; F16L 3/08; F16L 3/26
See application file for complete search history.

(56) References Cited

U.S. PATENT DOCUMENTS

| 6,435,354 | B1 * | 8/2002 | Gray .................... H05K 7/1491 211/26 |
|---|---|---|---|
| 7,472,795 | B2 | 1/2009 | Dubon et al. |
| 7,554,819 | B2 | 6/2009 | Chen et al. |
| 7,654,398 | B2 | 2/2010 | Bridges et al. |
| 7,712,615 | B2 | 5/2010 | Chen et al. |
| 7,746,667 | B1 | 6/2010 | Baiza et al. |
| 8,231,014 | B2 | 7/2012 | Chen et al. |
| 8,251,321 | B2 | 8/2012 | Chen et al. |
| 2009/0078834 | A1 * | 3/2009 | Chen .................... H01R 9/2416 248/70 |
| 2010/0193646 | A1 * | 8/2010 | Chen .................... H02G 3/0456 248/70 |
| 2014/0158646 | A1 | 6/2014 | Chen et al. |
| 2014/0158834 | A1 | 6/2014 | Chen et al. |
| 2014/0183306 | A1 * | 7/2014 | Chen .................... H05K 7/1421 248/70 |

* cited by examiner

*Primary Examiner* — Christopher E Garft
(74) *Attorney, Agent, or Firm* — Rosenberg, Klein & Lee

(57) ABSTRACT

A cable management assembly adapted for first and second slide rail assemblies includes first and second cable management brackets which are connected together, a supporting base, and a supporting member pivotally connected to the supporting base. The first slide rail assembly includes first and second rails. The cable management brackets are connectable to the rails respectively. The supporting base is connectable to the second slide rail assembly. The supporting member has a portion located between the cable management brackets. When the second rail is longitudinally displaced relative to the first rail from a retracted position toward an extended position, the first cable management bracket drives the portion of the supporting member and thereby rotates the supporting member relative to the supporting base.

8 Claims, 15 Drawing Sheets

CABLE MANAGEMENT ASSEMBLY

FIELD OF THE INVENTION

The present invention relates to a cable management assembly and, more particularly, to a cable management assembly having a cantilever-type supporting structure.

BACKGROUND OF THE INVENTION

The development of cable management assemblies is briefly stated as follows. Dubon et al. (U.S. Pat. No. 7,472,795 B2) and Chen et al. (U.S. Pat. No. 7,554,819 B2) invented cable management assemblies which include a supporting member and a cable management arm. The two ends of the supporting member are mounted to a pair of spaced-apart slide rail assemblies respectively in order for the supporting member to support the cable management arm.

Later on, Chen et al. (U.S. Pat. No. 7,712,615 B2; U.S. Pat. No. 8,231,014 B2; and U.S. Pat. No. 8,251,321 B2) invented cable management assemblies which include a retractable supporting member. Basically, both ends of the supporting member are still required to be mounted to a pair of spaced-apart slide rail assemblies respectively in order for the supporting member to support the cable management arm.

In the recently invented cable management assemblies of Chen et al. (US 2014/0158646 A1, US 2014/0158834 A1, and US 2014/0183306 A1), only one end of the retractable supporting member is required to be mounted to one of a pair of slide rail assemblies in order to form a cantilever support for the cable management arm.

A cantilever-type retractable supporting member is capable of supporting a cable management arm extended to a great length. If the cable management arm can only be extended by a small distance, it will be inappropriate to use such a retractable supporting member.

SUMMARY OF THE INVENTION

The present invention relates to a cable management assembly in which a supporting member is pivotally connected to a supporting base so that, when displaced, a cable management bracket of the cable management assembly can drive the supporting member to rotate relative to the supporting base.

According to one aspect of the present invention, a cable management assembly to be mounted to a pair of slide rail assemblies is provided. The pair of slide rail assemblies includes a first slide rail assembly and a second slide rail assembly, wherein the first slide rail assembly includes a first rail and a second rail which can be longitudinally displaced relative to the first rail. The cable management assembly can be mounted to a rack via the pair of slide rail assemblies and includes a first cable management bracket, a second cable management bracket connected to the first cable management bracket, a plurality of cable supporting features, a supporting base, a supporting member, and an actuator. The first cable management bracket is adapted to be connected to the first rail of the first slide rail assembly. The second cable management bracket is adapted to be connected to the second rail of the first slide rail assembly. The cable supporting features are connected to the first cable management bracket and the second cable management bracket. The supporting base is adapted to be connected to the second slide rail assembly. The supporting member is pivotally connected to the supporting base and is configured for supporting at least one of the first cable management bracket and the second cable management bracket. The actuator is connected to the supporting member and corresponds to the first cable management bracket and the second cable management bracket. In the course in which the second rail of the first slide rail assembly is displaced relative to the first rail from a retracted position toward an extended position, the second cable management bracket drives the first cable management bracket into displacement and thereby drives the actuator to rotate the supporting member relative to the supporting base by an angle. In the course in which the second rail of the first slide rail assembly is displaced relative to the first rail from the extended position toward the retracted position, the second cable management bracket drives the actuator to rotate the supporting member relative to the supporting base toward the initial position of the supporting member.

Preferably, the first cable management bracket includes a cable management arm having a first end and a second end, the second cable management bracket includes a cable management arm having a first end and a second end, and the cable management assembly further includes an intermediate bracket pivotally connected between the first end of the cable management arm of the first cable management bracket and the first end of the cable management arm of the second cable management bracket.

Preferably, the cable management assembly further includes a mounting bracket which is pivotally connected to the second end of the cable management arm of the first cable management bracket and via which the first cable management bracket can be connected to the first rail of the first slide rail assembly.

Preferably, the cable management assembly further includes a mounting bracket which is pivotally connected to the second end of the cable management arm of the second cable management bracket and via which the second cable management bracket can be connected to the second rail of the first slide rail assembly.

Preferably, the supporting base has a sidewall and a base portion generally perpendicularly connected to the sidewall. The sidewall is provided with a mounting bracket via which the supporting base can be connected to the second slide rail assembly. Preferably, the base portion of the supporting base has a blocking member for limiting the angle by which the supporting member can be rotated relative to the base portion of the supporting base. Preferably, the supporting member has a first end, a second end corresponding in position to the first end, and a main body connected between the first end and the second end. The first end of the supporting member is pivotally connected to the base portion of the supporting base via a pivotal connecting element so that the supporting member can rotate freely relative to the base portion of the supporting base. The actuator is mounted to the second end of the supporting member via an engaging member and is thereby rendered upright with respect to the main body of the supporting member.

Preferably, the cable management assembly further includes an elastic member for providing an elastic force when the supporting member is rotated relative to the supporting base. The supporting member can respond to the elastic force such that rotation of the supporting member relative to the supporting base is made easy.

Preferably, the supporting base includes an adjusting member movably connected to the supporting base; the adjusting member includes a first bracket, a second bracket, and a positioning element elastically mounted to one of the first bracket and the second bracket; and the supporting base further has a first positioning hole and a second positioning hole, both corresponding to the positioning element.

Preferably, and as an alternative, the supporting base includes an adjusting member movably connected to the supporting base; the adjusting member includes a first bracket, a second bracket, and a threaded hole provided between the first bracket and the second bracket; and the supporting base further has a slot. A portion of the slot corresponds in position to the threaded hole so that a threaded element can pass through the slot, connect with the threaded hole, and thus be fixed in position.

One of the advantageous features of implementing the present invention is that the supporting member of the cable management assembly is pivotally connected to the supporting base and therefore can be driven to rotate relative to the supporting base by one of the cable management brackets of the cable management assembly when this cable management bracket is displaced.

BRIEF DESCRIPTION OF THE DRAWINGS

The invention as well as a preferred mode of use and the advantages thereof will be best understood by referring to the following detailed description of some illustrative embodiments in conjunction with the accompanying drawings, in which.

DETAILED DESCRIPTION OF THE INVENTION

Figure 1:
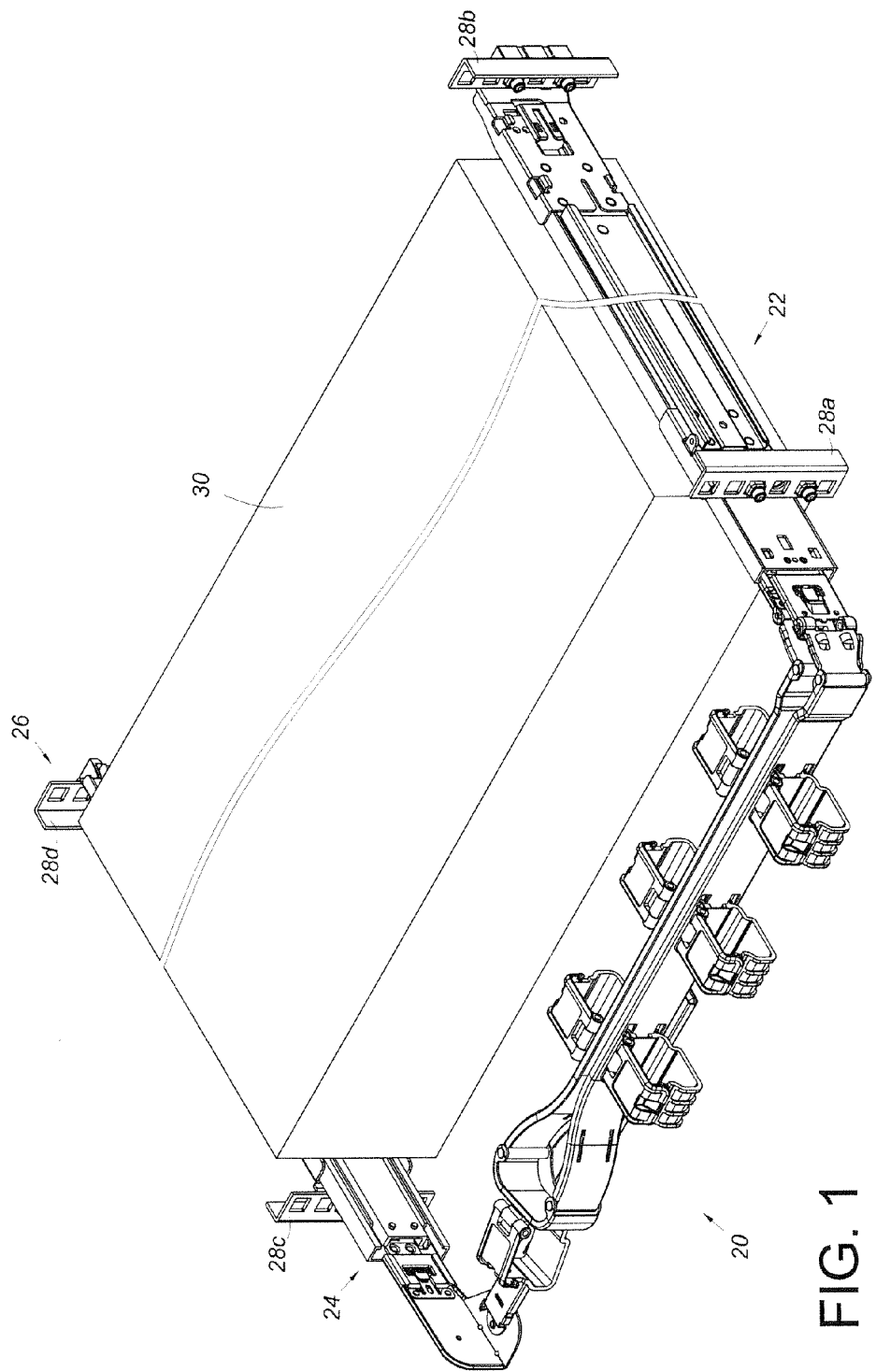
FIG. 1 is a schematic drawing in which the cable management assembly in an embodiment of the present invention is mounted to a pair of slide rail assemblies carrying an object.

Referring to FIG. 1, the cable management assembly 20 according to an embodiment of the present invention is mounted to a pair of slide rail assemblies, which includes a first slide rail assembly 22 and a second slide rail assembly 24. The slide rail assemblies 22 and 24 are configured to be mounted to a rack 26, and the cable management assembly 20 is configured to be mounted to the rack 26 by way of the slide rail assemblies 22 and 24. Generally, the rack 26 includes a first post 28a, a second post 28b, a third post 28c, and a fourth post 28d. The first slide rail assembly 22 is mounted between the first post 28a and the second post 28b while the second slide rail assembly 24 is mounted between the third post 28c and the fourth post 28d. The first slide rail assembly 22 generally corresponds in position to the second slide rail assembly 24. When in use, an object 30 (e.g., a server, storage device, or other electronic device) can be mounted between the first slide rail assembly 22 and the second slide rail assembly 24 in order for the cable management assembly 20 to keep the cables (not shown) of the object 30 in neat arrangement.

Figure 2:
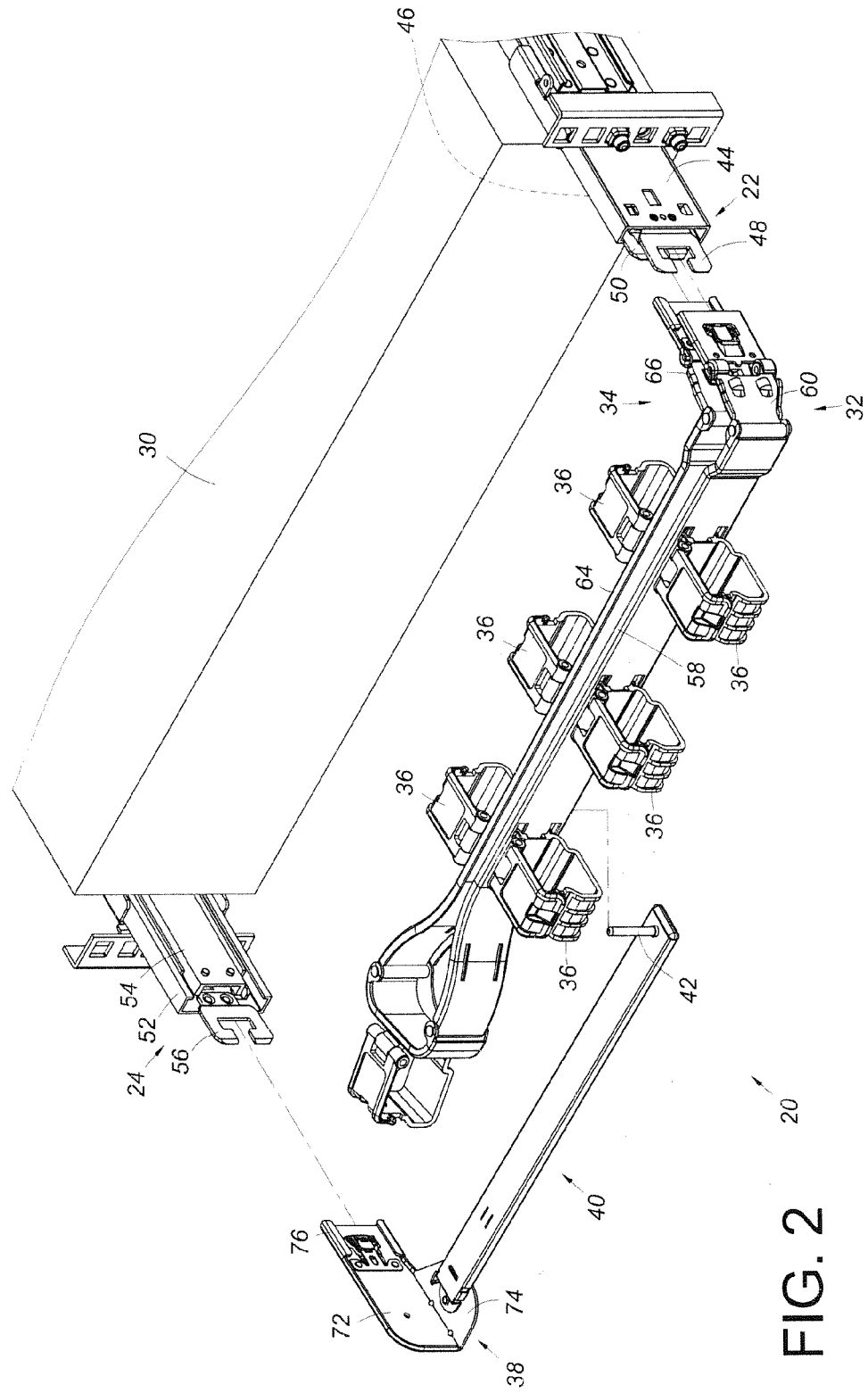
FIG. 2 is a schematic exploded view of the cable management assembly and the slide rail assemblies in FIG. 1.

As shown in FIG. 2, the cable management assembly 20 includes a first cable management bracket 32, a second cable management bracket 34 connected to the first cable management bracket 32, a plurality of cable supporting features 36, a supporting base 38, a supporting member 40, and an actuator 42. The first slide rail assembly 22 at least includes a first rail 44 and a second rail 46 which can be longitudinally displaced relative to the first rail 44. The first rail 44 is provided with a connecting base 48, and the second rail 46 is provided with a connecting base 50. The second slide rail assembly 24 includes a first rail 52 and a second rail 54 which can be longitudinally displaced relative to the first rail 52. The first rail 52 is provided with a connecting base 56.

Figure 3:
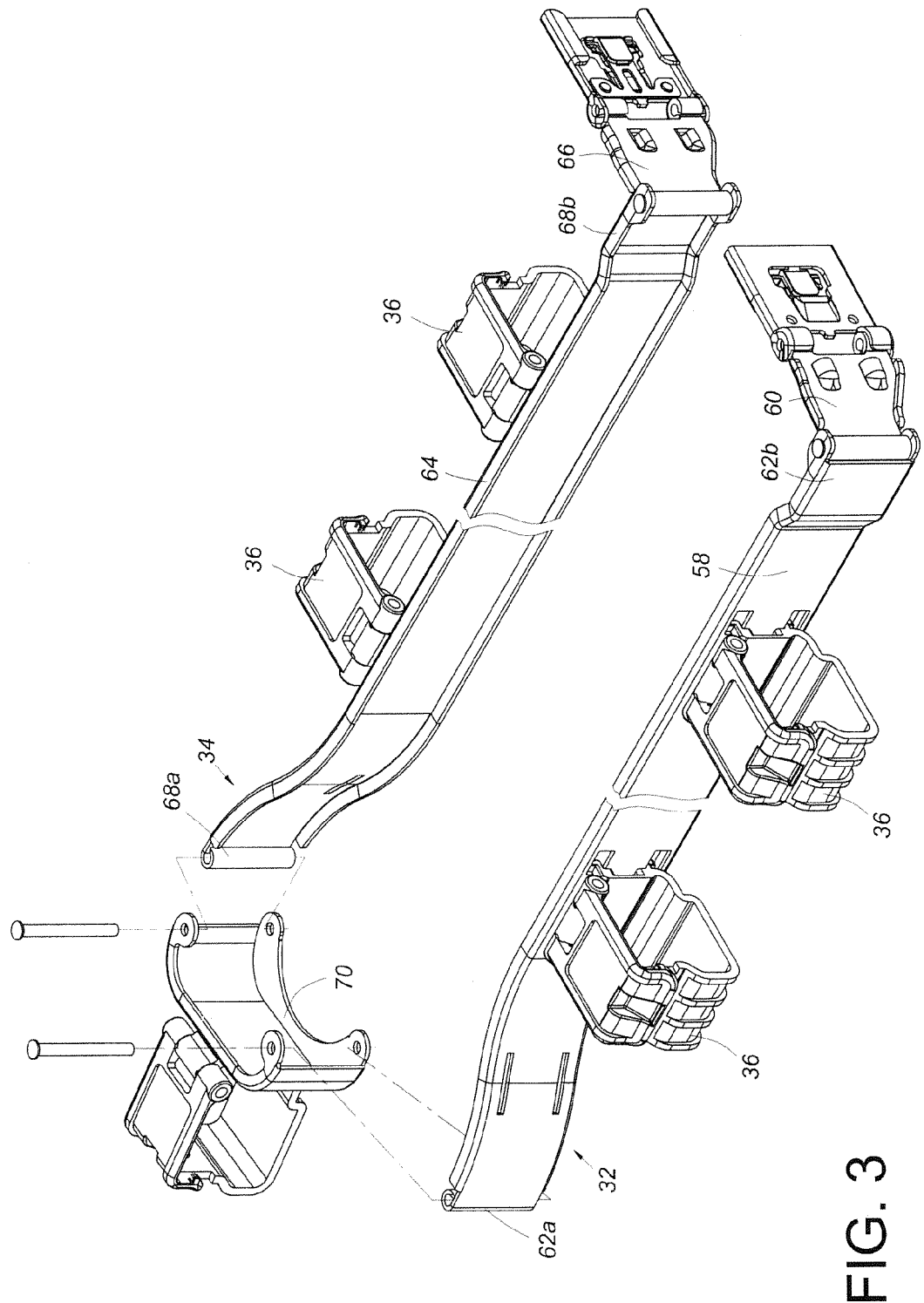
FIG. 3 is a schematic exploded view of the cable management assembly in FIG. 1.

As shown in FIG. 2 and FIG. 3, the first cable management bracket 32 includes a cable management arm 58 and a mounting bracket 60. The cable management arm 58 has a first end 62a and a second end 62b corresponding in position to the first end 62a. The mounting bracket 60 is pivotally connected to the cable management arm 58 at a position adjacent to the second end 62b. When in use, the first cable management bracket 32 is connected to the connecting base 48 of the first rail 44 of the first slide rail assembly 22 via the mounting bracket 60. The second cable management bracket 34, on the other hand, includes a cable management arm 64 and a mounting bracket 66. The cable management arm 64 has a first end 68a and a second end 68b corresponding in position to the first end 68a. In this embodiment, the cable management assembly 20 further includes an intermediate bracket 70 connected between the first end 62a of the cable management arm 58 of the first cable management bracket 32 and the first end 68a of the cable management arm 64 of the second cable management bracket 34. The mounting bracket 66 is pivotally connected to the cable management arm 64 at a position adjacent to the second end 68b. When in use, the second cable management bracket 34 is connected to the connecting base 50 of the second rail 46 of the first slide rail assembly 22 via the mounting bracket 66. The plurality of cable supporting features 36 serve to keep the cables (not shown) of the object 30 in order. The cable supporting features 36 are connected to the first cable management bracket 32 and the second cable management bracket 34.

Figure 4B:
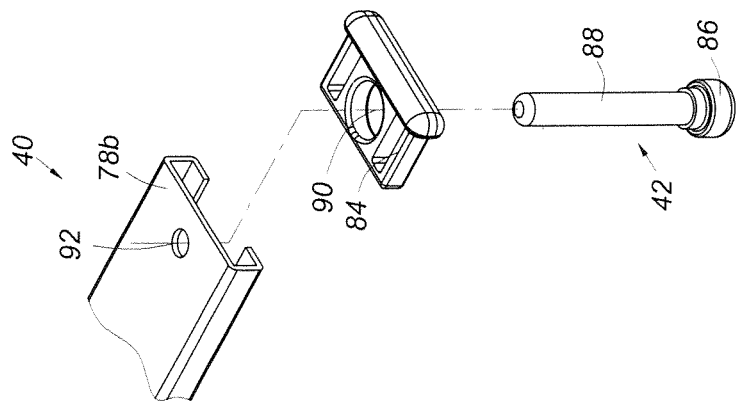
FIG. 4B is a schematic exploded view of the supporting member and the actuator in FIG. 1.
Figure 4A:
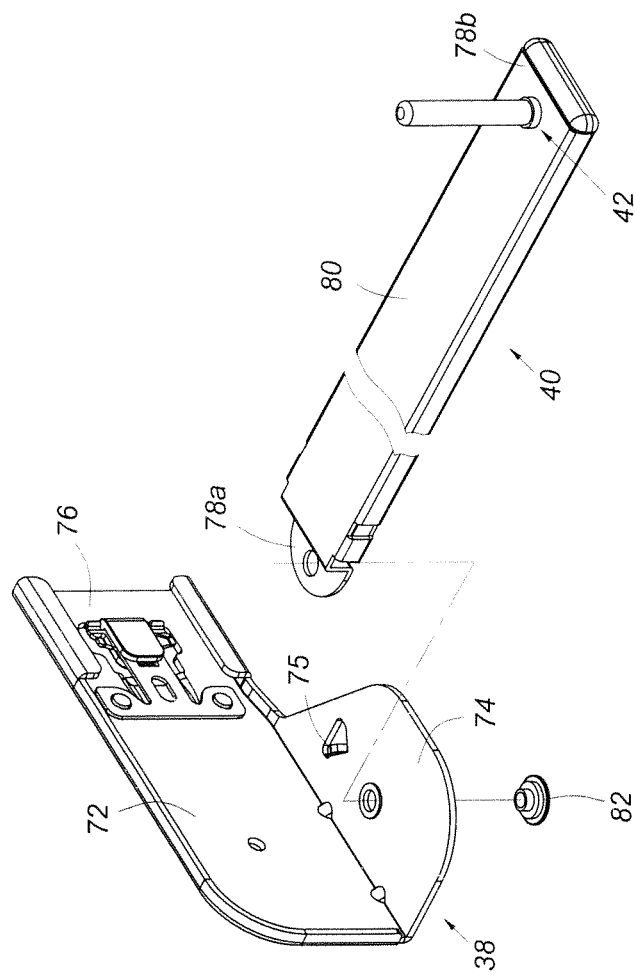
FIG. 4A is a schematic exploded view of the supporting member and the supporting base in FIG. 1.

FIG. 4A shows how the supporting base 38 and the supporting member 40 are arranged with respect to each other. As shown in the drawing, the supporting base 38 has a sidewall 72 and a base portion 74 generally perpendicularly connected to the sidewall 72. The sidewall 72 is provided with a mounting bracket 76. When in use, referring to FIG. 2, the supporting base 38 is connected to the connecting base 56 of the first rail 52 of the second slide rail assembly 24 via the mounting bracket 76. The supporting member 40 has a first end 78a, a second end 78b corresponding in position to the first end 78a, and a main body 80 connected between the first end 78a and the second end 78b. The first end 78a of the supporting member 40 is pivotally connected to the base portion 74 of the supporting base 38 via a pivotal connecting element 82 so that the supporting member 40 can rotate freely relative to the base portion 74 of the supporting base 38. In this embodiment, the base portion 74 of the supporting base 38 further has a blocking member 75 for limiting the angle by which the supporting member 40 can be rotated relative to the base portion 74 of the supporting base 38.

Referring to FIG. 4B, the actuator 42 in this embodiment is mounted via an engaging member 84 to the supporting member 40 at a position adjacent to the second end 78b. The actuator 42, which is mounted to the supporting member 40, can be viewed as a part of the supporting member 40. More specifically, the actuator 42 has a head 86 and a body 88 extending from the head 86. The engaging member 84 has a hole 90, and the second end 78b of the supporting member 40 also has a hole 92. The body 88 of the actuator 42 passes the two holes 90 and 92 such that the actuator 42 is mounted to the supporting member 40 at a position adjacent to the second end 78b and stands upright with respect to the main body 80 of the supporting member 40.

Figure 5:
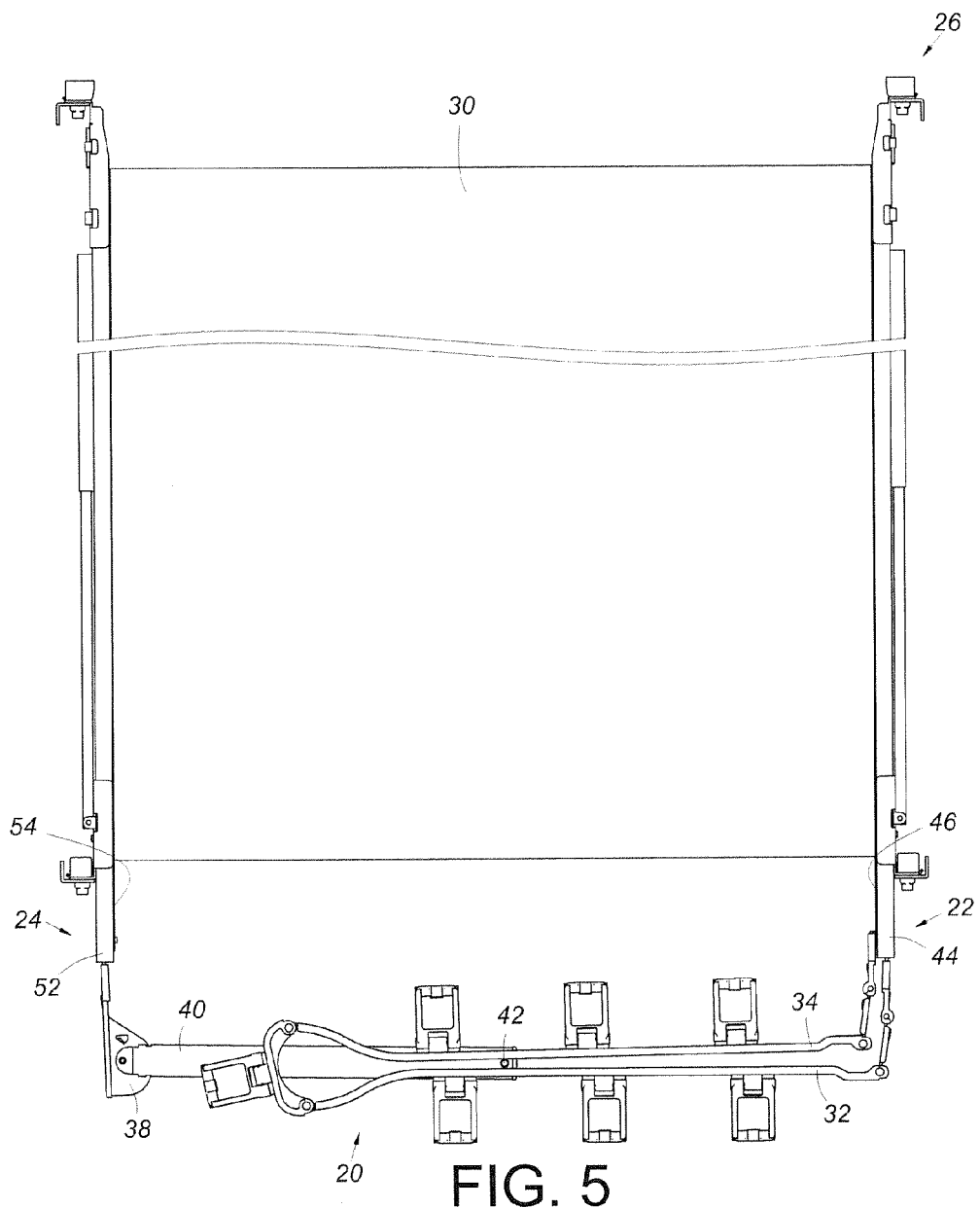
FIG. 5 schematically shows a state in which the first cable management bracket and the second cable management bracket of the cable management assembly in an embodiment of the present invention are close to each other and the supporting member lies below both the first cable management bracket and the second cable management bracket.

In FIG. 5, the first slide rail assembly 22 and the second slide rail assembly 24 are mounted to the rack 26 and are located within the rack 26. The first cable management bracket 32 of the cable management assembly 20 is mounted to the first rail 44 of the first slide rail assembly 22 while the second cable management bracket 34 is mounted to the second rail 46 of the first slide rail assembly 22. The supporting base 38 is mounted to the first rail 52 of the second slide rail assembly 24. In addition, the object 30 is mounted between the second rail 46 of the first slide rail assembly 22 and the second rail 54 of the second slide rail assembly 24. In the foregoing arrangement, the first cable management bracket 32 and the second cable management bracket 34 are close to each other, and the supporting member 40 lies below both the first cable management bracket 32 and the second cable management bracket 34. When the first cable management bracket 32 and the second cable management bracket 34 are so loaded with cables that they move downward with respect to the supporting member 40, the supporting member 40 can support at least one of the first cable management bracket 32 and the second cable management bracket 34. On the other hand, the actuator 42 corresponds to the first cable management bracket 32 and the second cable management bracket 34. In this embodiment, the actuator 42 corresponds to and is located between the first cable management bracket 32 and the second cable management bracket 34.

Figure 6:
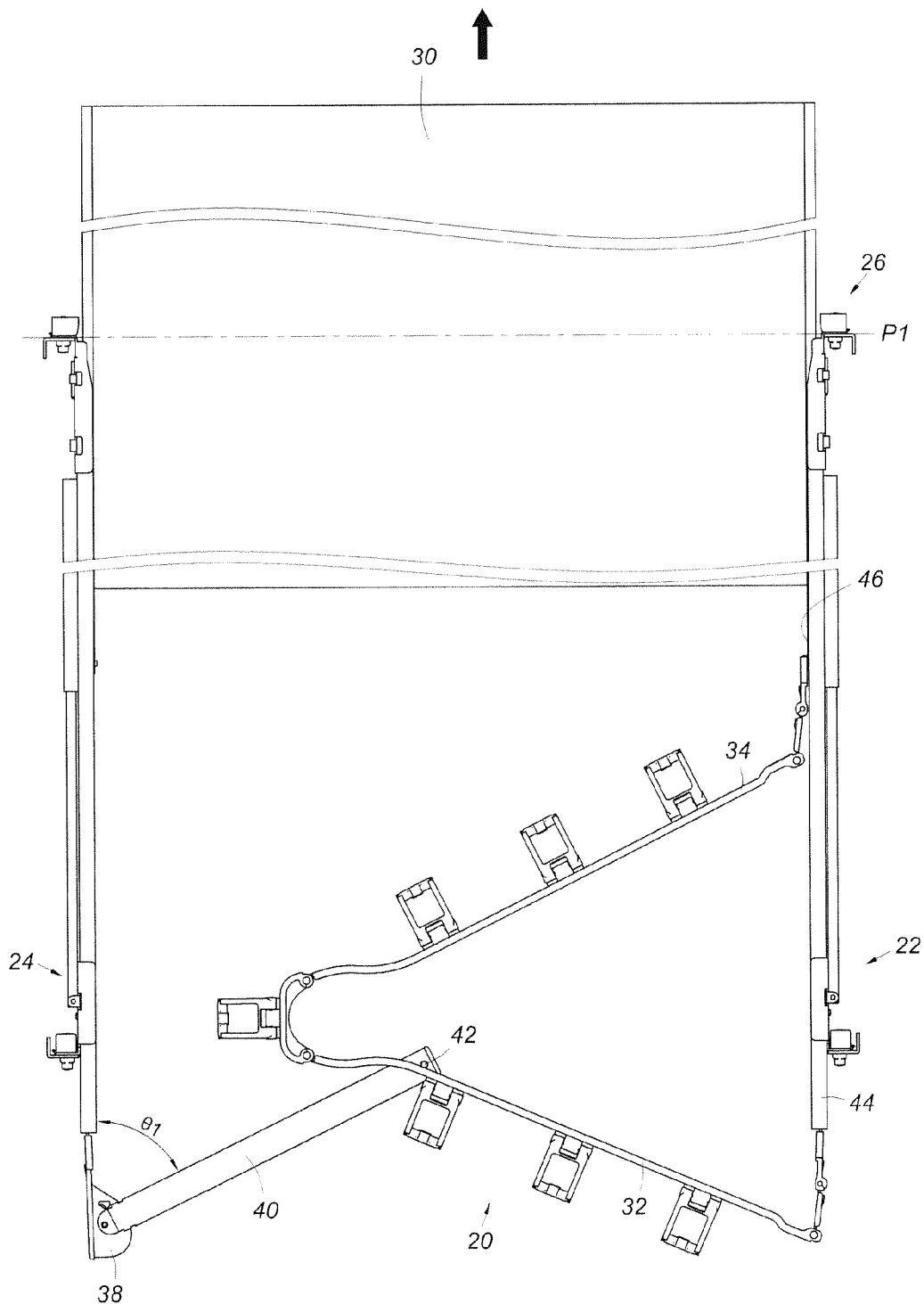
FIG. 6 schematically shows how the second cable management bracket of the cable management assembly in FIG. 5 is extended relative to the first cable management bracket and thereby rotates the supporting member relative to the supporting base when a second rail of a slide rail assembly is pulled out relative to a first rail of the slide rail assembly.

Referring to FIG. 6, in the course in which the object 30 is pulled out from the rack 26 toward a first position P1, the second rail 46 of the first slide assembly 22 is displaced from a retracted position toward an extended position relative to the first rail 44 and therefore drives the first cable management bracket 32 and the second cable management bracket 34 of the cable management assembly 20 to extend. The first cable management bracket 32 in turn drives a portion (e.g., the actuator 42) of the supporting member 40 such that the supporting member 40 is rotated from an initial position by a first angle θ1 with respect to the supporting base 38. Thereby a portion of the first cable management bracket 32 lies on a portion of the supporting member 40 that is adjacent to the actuator 42. Thus, the supporting member 40 in this state effectively supports the first cable management bracket 32 and the second cable management bracket 34 of the cable management assembly 20.

Figure 7:
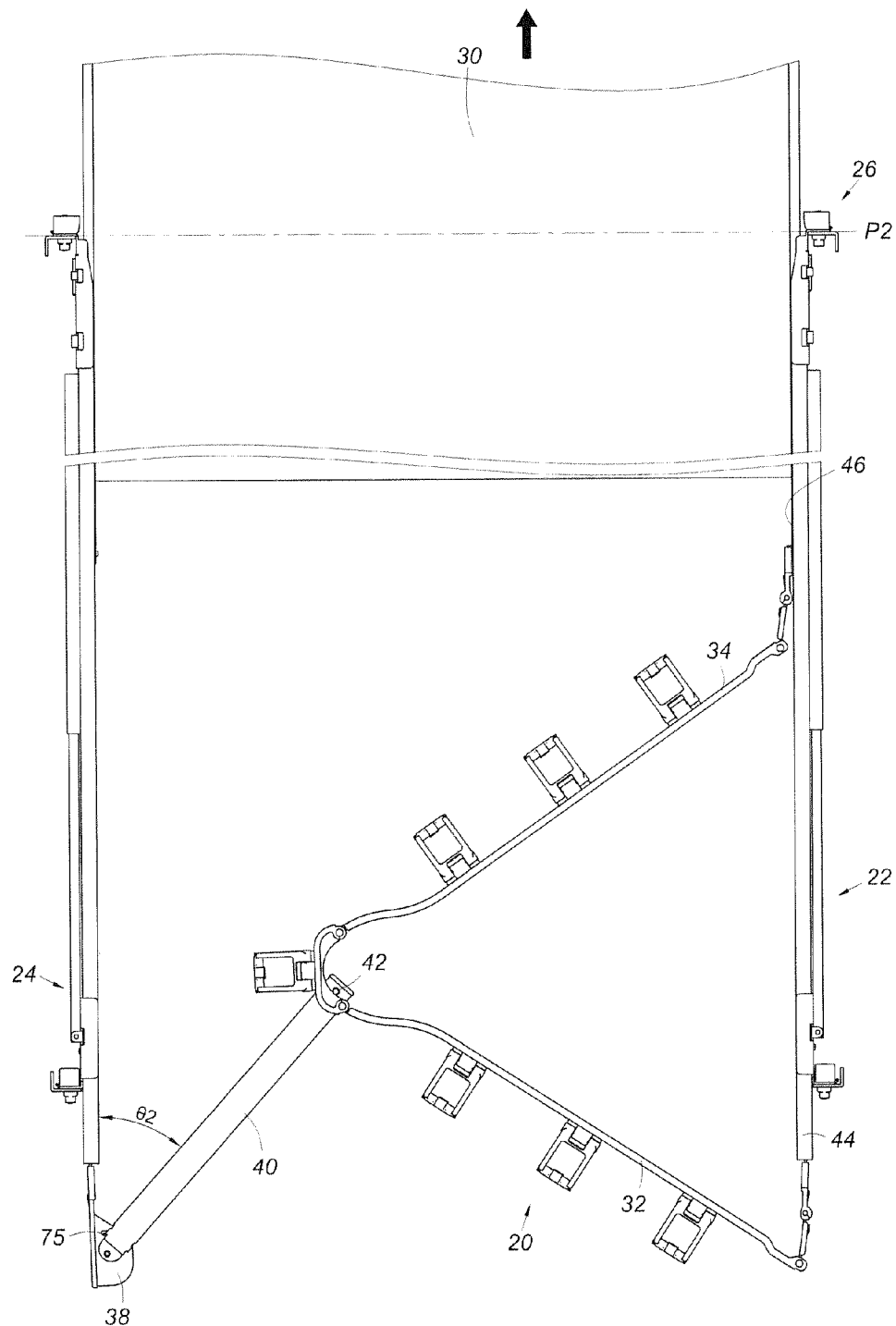
FIG. 7 schematically shows how the second cable management bracket of the cable management assembly in FIG. 6 is further extended relative to the first cable management bracket and thus further rotates the supporting member relative to the supporting base when the second rail of the slide rail assembly is further pulled out relative to the first rail.

Referring to FIG. 7, in the course in which the object 30 is pulled from the first position P1 toward a second position P2, the first cable management bracket 32 and the second cable management bracket 34 of the cable management assembly 20 are driven to extend further by the second rail 46 of the first slide rail assembly 22 and in turn drive the actuator 42 further such that the supporting member 40 is rotated from the position where it is at the first angle θ1 with respect to the supporting base 38 to another position, where the supporting member 40 is at a second angle θ2 with respect to the supporting base 38 and is pressed against the blocking member 75 of the supporting base 38. In this state, a portion of the first cable management bracket 32 still lies on the supporting member 40 at a position adjacent to the actuator 42. so the supporting member 40 keeps supporting the first cable management bracket 32 and the second cable management bracket 34 of the cable management assembly 20 effectively.

Figure 8:
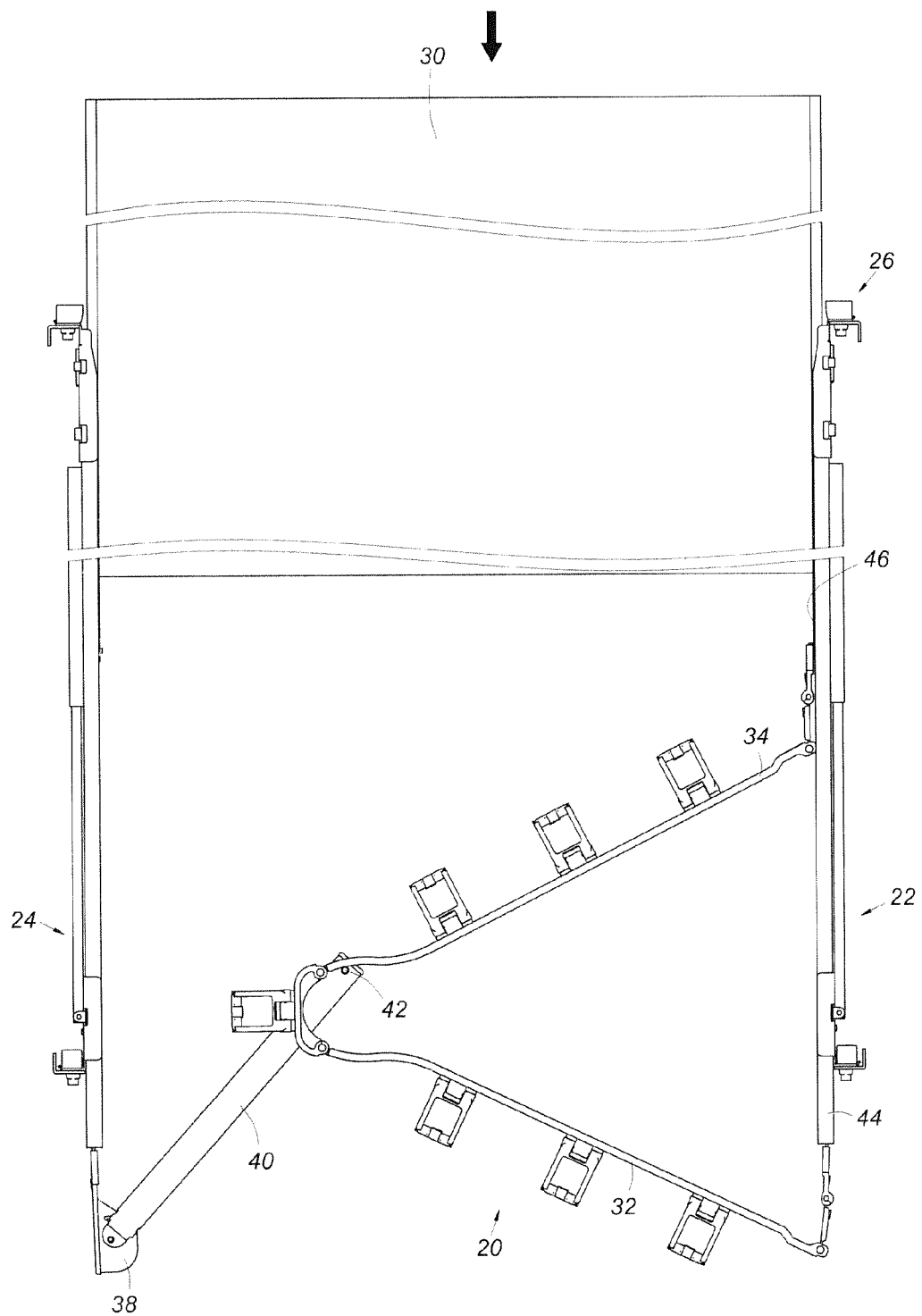
FIG. 8 schematically shows how the first cable management bracket and the second cable management bracket of the cable management assembly in FIG. 7 are brought closer to each other by the second rail of the slide rail assembly when the second rail is retracted with respect to the first rail.
Figure 9:
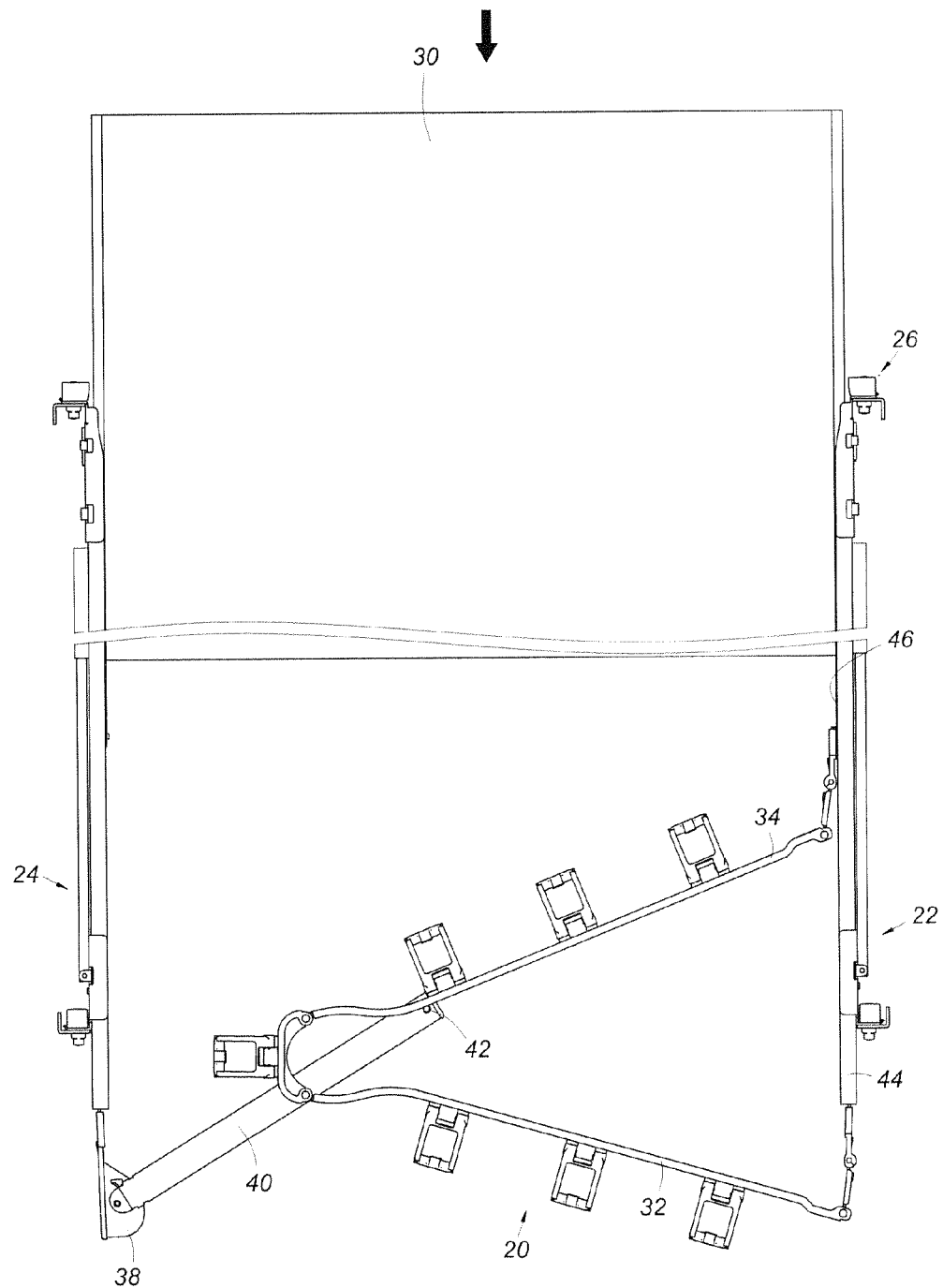
FIG. 9 schematically shows how the first cable management bracket and the second cable management bracket of the cable management assembly in FIG. 8 are brought even closer to each other by the second rail of the slide rail assembly when the second rail is further retracted with respect to the first rail.

FIG. 8 and FIG. 9 show how the object 30 is pushed back into the rack 26. In the process, the first cable management bracket 32 and the second cable management bracket 34 of the cable management assembly 20 are brought closer to each other by the second rail 46 of the first slide rail assembly 22, and the second cable management bracket 34 drives the actuator 42 in such a way that the supporting member 40 is rotated relative to the supporting base 38 and displaced toward the initial position. Eventually, the cable management assembly 20 can be folded to the state shown in FIG. 5.

Figure 10:
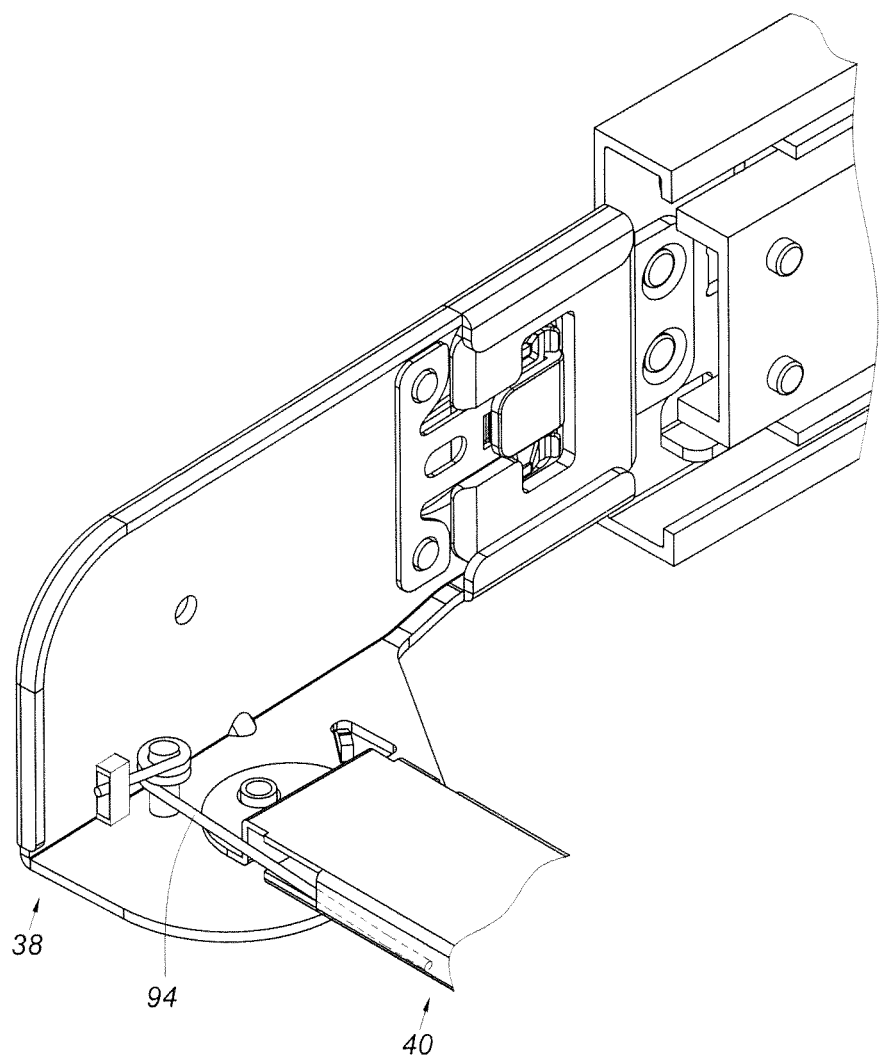
FIG. 10 schematically shows how an elastic member of the cable management assembly in an embodiment of the present invention is mounted between the supporting member and the supporting base.

Referring to FIG. 10, the present embodiment further includes an elastic member 94 configured to provide an elastic force when the supporting member 40 is rotated relative to the supporting base 38. The supporting member 40 can respond to the elastic force and therefore rotates readily with respect to the supporting base 38.

Figure 11:
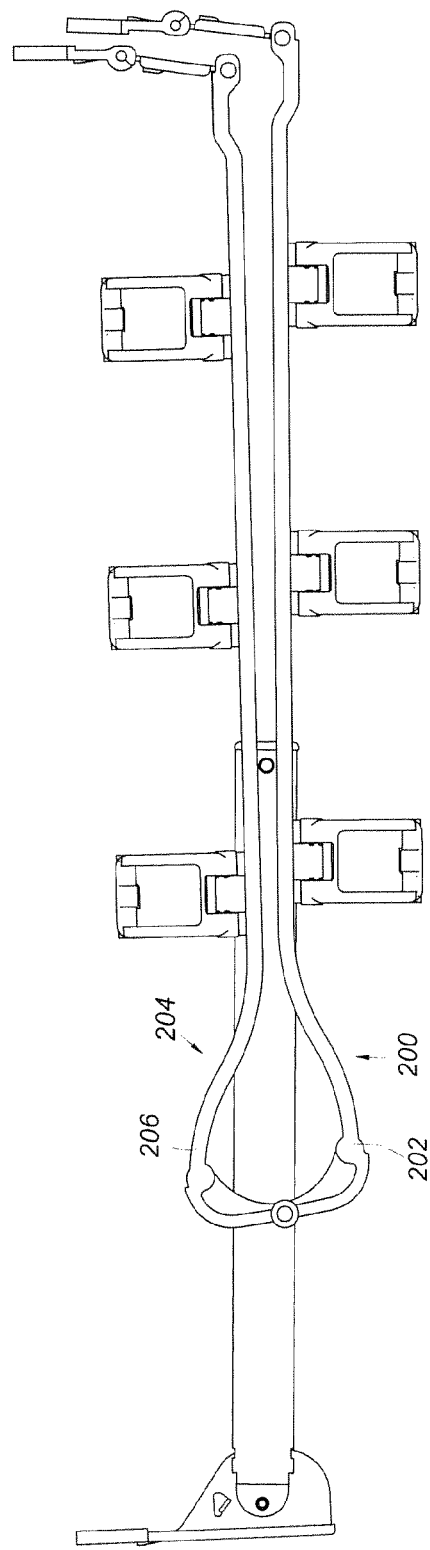
FIG. 11 schematically shows how the first cable management bracket and the second cable management bracket of the cable management assembly in an embodiment of the present invention are directly pivotally connected to each other.
Figure 12:
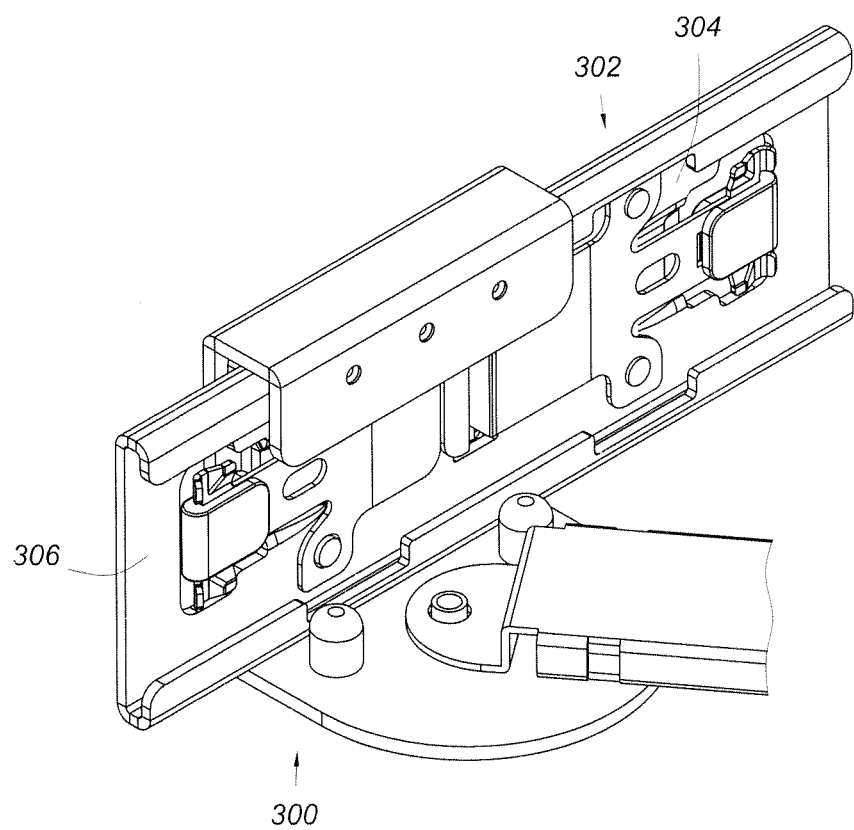
FIG. 12 is a schematic perspective view of the supporting base of the cable management assembly in an embodiment of the present invention.
Figure 13A:
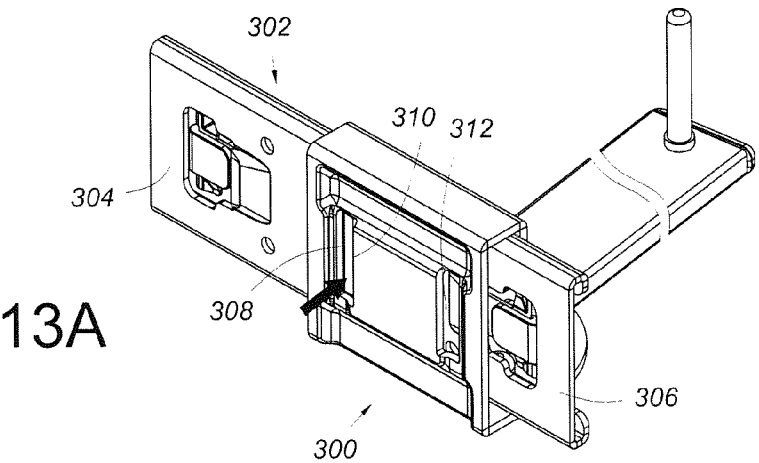
FIG. 13A schematically shows how the positioning element of the adjusting member of the cable management assembly in FIG. 12 is correspondingly engaged in the first positioning hole of the supporting base.
Figure 13B:
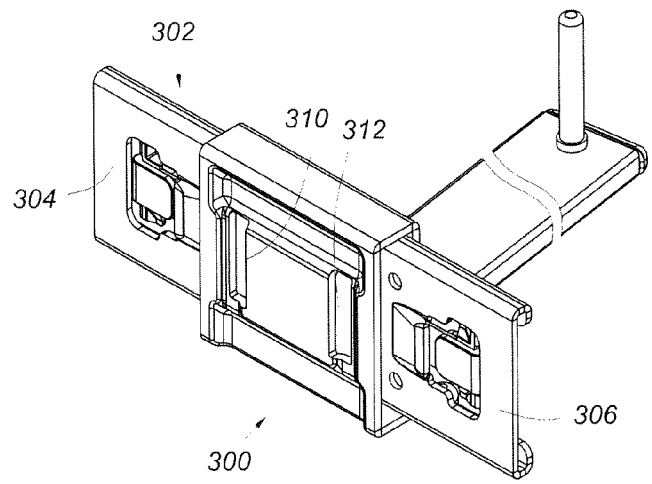
FIG. 13B schematically shows how the adjusting member of the cable management assembly in FIG. 12 is adjusted, i.e., displaced, with respect to the supporting base.
Figure 13C:
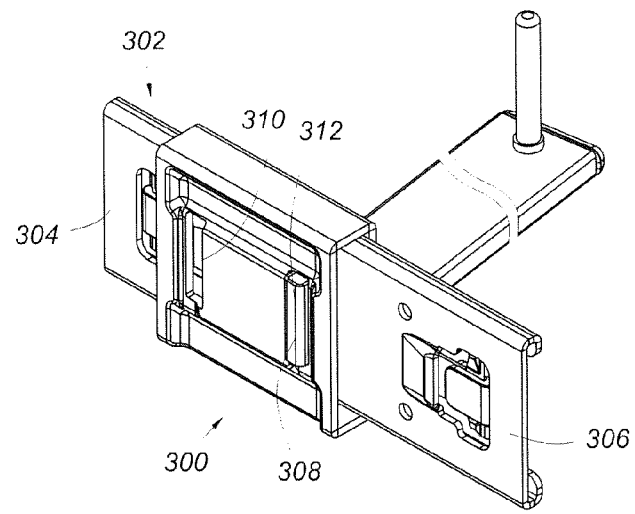
FIG. 13C schematically shows how the positioning element of the adjusting member of the cable management assembly in FIG. 12 is correspondingly engaged in the second positioning hole of the supporting base.

FIG. 11 shows the cable management assembly according to another embodiment of the present invention. In this embodiment, the cable management arm 202 of the first cable management bracket 200 is directly pivotally connected to the cable management arm 206 of the second cable management bracket 204 such that the first cable management bracket 200 and the second cable management bracket 204 are pivotally connected. In other words, this embodiment and the previous embodiment (see FIG. 3) illustrate two feasible relationships between the cable management brackets, namely direct pivotal connection and indirect pivotal connection via the intermediate bracket 70. The present invention imposes no limitations in this regard.

Figure 14A:
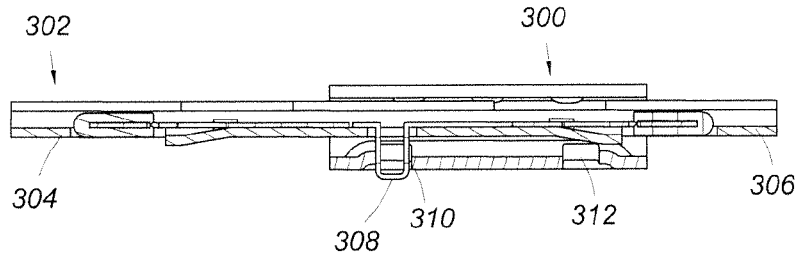
FIG. 14A is a schematic sectional view showing how the positioning element of the adjusting member of the cable management assembly in FIG. 12 is correspondingly engaged in the first positioning hole of the supporting base.
Figure 14B:
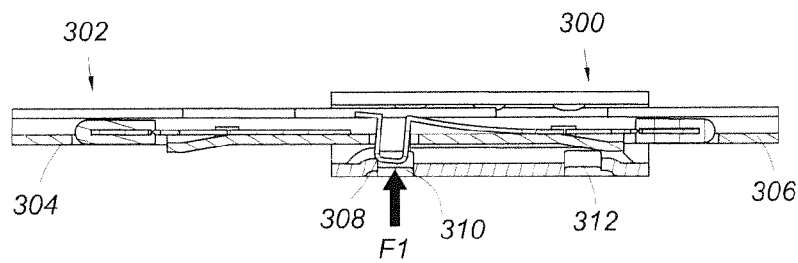
FIG. 14B is a schematic sectional view showing how a force is applied through the first positioning hole to the positioning element of the adjusting member of the cable management assembly in FIG. 12.
Figure 14C:
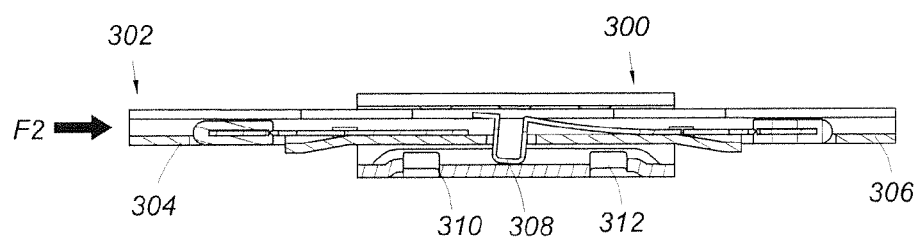
FIG. 14C is a schematic sectional view showing how the adjusting member of the cable management assembly in FIG. 12 is adjusted, i.e., displaced, with respect to the supporting base.
Figure 14D:
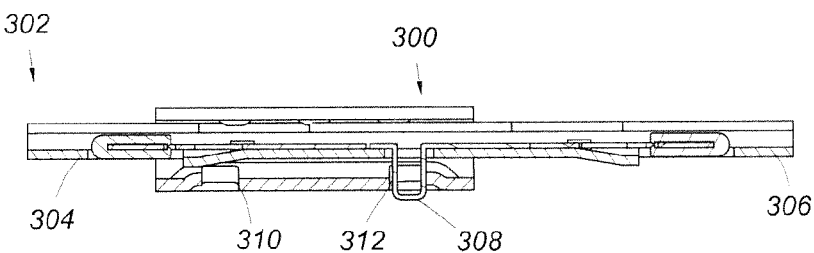
FIG. 14D is a schematic sectional view showing how the positioning element of the adjusting member of the cable management assembly in FIG. 12 is correspondingly engaged in the second positioning hole of the supporting base.

FIG. 12, FIGS. 13A~13C, and FIGS. 14A~14D show the structure of the supporting base in yet another embodiment of the present invention. In this embodiment, the supporting base 300 includes an adjusting member 302 movably connected to the supporting base 300. The adjusting member 302 includes a first bracket 304, a second bracket 306, and a positioning element 308 elastically mounted to one of the first bracket 304 and the second bracket 306. The supporting base 300 has a first positioning hole 310 and a second positioning hole 312, both of which correspond to the positioning element 308. When the positioning element 308 is engaged, and therefore fixed in position, in the first positioning hole 310 of the supporting base 300, the supporting base 300 can be connected to the connecting base 56 of the first rail 52 of the aforesaid second slide rail assembly 24 via the first bracket 304, as shown in FIG. 2. To operate (i.e., displace) the positioning element 308, referring to FIG. 14B, a force F1 is applied to move the positioning element 308 out of the first positioning hole 310 of the supporting base 300, and a force F2 is applied to displace the adjusting member 302, as shown in FIG. 14C, so that the positioning element 308 is engaged in the second positioning hole 312 of the supporting base 300 and secured in position, as shown in FIG. 14D. The supporting base 300 in this configuration can be connected to the connecting base 48 of the first rail 44 of the aforesaid first slide rail assembly 22 via the second bracket 306. In this embodiment, therefore, the cable management brackets and the supporting base can be selectively and respectively connected to the slide rail assemblies according to actual installation needs.

Figure 15:
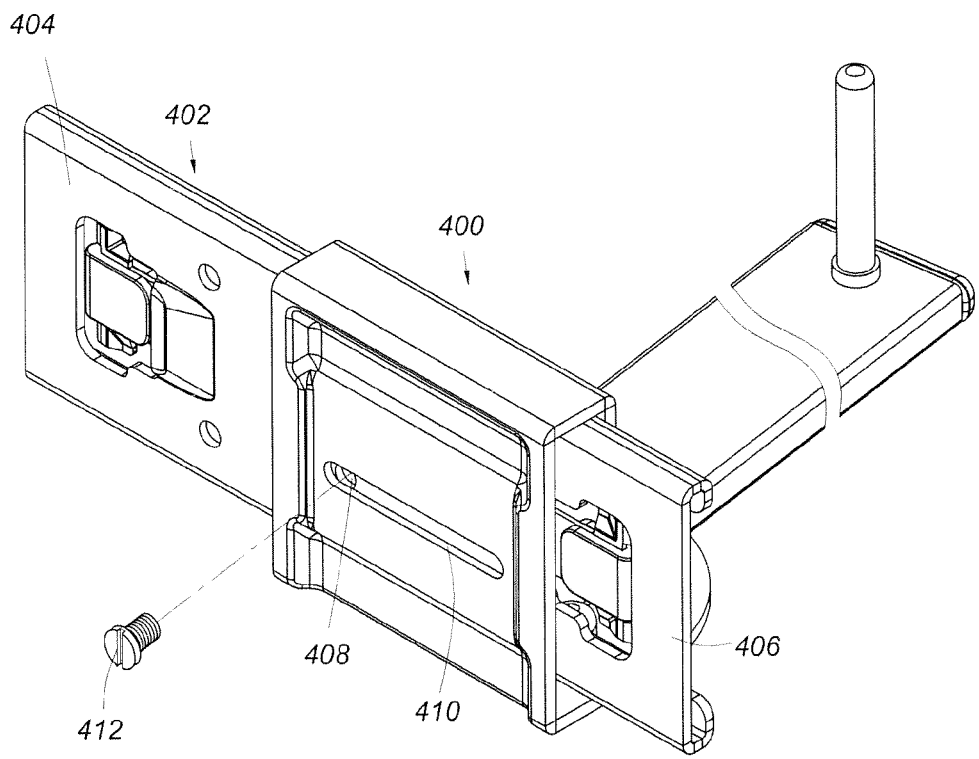
FIG. 15 schematically shows the supporting base of the cable management assembly in another embodiment of the present invention.

FIG. 15 show the structure of the supporting base in still another embodiment of the present invention. In this embodiment, the supporting base 400 includes an adjusting member 402 movably connected to the supporting base 400. The adjusting member 402 includes a first bracket 404, a second bracket 406, and a threaded hole 408 provided between the first bracket 404 and the second bracket 406. The supporting base 400 has a slot 410, and a portion of the slot 410 corresponds in position to the threaded hole 408. A threaded element 412 is passed through the slot 410, connected with the threaded hole 408, and thereby fixed in position. For adjustment, the threaded element 412 is loosened so that the adjusting member 402 can be moved relative to the supporting base 400. Therefore, the cable management brackets and the supporting base in this embodiment can also be selectively and respectively connected to the slide rail assemblies to meet actual installation needs.

While the present invention has been disclosed herein by way of the preferred embodiments described above, the embodiments are pot intended to be restrictive of the present invention. The scope of patent protection sought by the applicant is defined by the appended claims.

The invention claimed is:

1. A cable management assembly, to be mounted to a pair of slide rail assemblies including a first slide rail assembly and a second slide rail assembly, the cable management assembly being mountable to a rack via the pair of slide rail assemblies, the first slide rail assembly including a first rail and a second rail longitudinally displaceable relative to the first rail, the cable management assembly comprising:
  a first cable management bracket adapted to be connected to the first rail of the first slide rail assembly;
  a second cable management bracket connected to the first cable management bracket and adapted to be connected to the second rail of the first slide rail assembly;
  a plurality of cable supporting features connected to the first cable management bracket and the second cable management bracket;
  a supporting base adapted to be connected to the second slide rail assembly;
  a supporting member having a first end terminating at a free second end, and a main body between the first and second ends, wherein the first end of the supporting member is pivotally connected to the supporting base such that the supporting member is rotatable relative to the supporting base and said supporting member is configured for supporting at least one of the first cable management bracket and the second cable management bracket; and
  an actuator connected to the supporting member adjacent the free second end and positioned upright with respect to the main body of the supporting member so that the actuator is positioned between the first cable management bracket and the second cable management bracket;
  wherein when the second rail of the first slide rail assembly is displaced relative to the first rail of the first slide rail assembly from a retracted position toward an extended position, the second cable management bracket displaces the first cable management bracket such that the first cable management bracket drives the actuator and thereby rotates the supporting member relative to the first end of the supporting member which is pivotally connected to the supporting base by an angle; and when the second rail of the first slide rail assembly is displaced relative to the first rail of the first slide rail assembly from the extended position toward the retracted position, the second cable management bracket drives the actuator and thereby rotates the supporting member relative to the first end of supporting member which is pivotally connected to the supporting base toward an initial position of the supporting member.

2. The cable management assembly of claim 1, wherein the first cable management bracket includes a cable management arm having a first end and a second end, the second cable management bracket includes a cable management arm having a first end and a second end, and the cable management assembly further comprises an intermediate bracket pivotally connected between the first end of the cable management arm of the first cable management bracket and the first end of the cable management arm of the second cable management bracket.

3. The cable management assembly of claim 2, further comprising a first mounting bracket pivotally connected to the second end of the cable management arm of the first cable management bracket, the first cable management bracket being connectable to the first rail of the first slide rail assembly via the first mounting bracket; and a second mounting bracket pivotally connected to the second end of the cable management arm of the second cable management bracket, the second cable management bracket being connectable to the second rail of the first slide rail assembly via the second mounting bracket.

4. The cable management assembly of claim 1, wherein the supporting base has a sidewall and a base portion generally perpendicularly connected to the sidewall, and the sidewall is provided with a third mounting bracket, the supporting base being connectable to the second slide rail assembly via the third mounting bracket.

5. The cable management assembly of claim 4, wherein the base portion of the supporting base has a blocking member for limiting an angle by which the supporting member is allowed to be rotated relative to the base portion of the supporting base.

6. The cable management assembly of claim 1, wherein the first end of the supporting member is pivotally connected to the supporting base via a pivotal connecting element, the second end of the supporting member is located about midway between the first and second slide rail assemblies when the cable management assembly is in the retracted position, and the actuator is connected to the supporting member adjacent the second end of the supporting member via an engaging member.

7. The cable management assembly of claim 1, further comprising an elastic member for providing an elastic force when the supporting member is rotated relative to the supporting base, wherein the supporting member is able to respond to the elastic force and therefore be rotated relative to the supporting base with ease.

8. A cable management assembly, comprising:
a first cable management bracket;
a second cable management bracket connected to the first cable management bracket;
a plurality of cable supporting features connected to the first cable management bracket and the second cable management bracket;
a supporting base;
a supporting member having a first end terminating at a free second end, and a main body between the first and second ends, wherein the first end of the supporting member is pivotally connected to the supporting base such that the supporting member is rotatable relative to the supporting base and the second end of the supporting member is located about midway between first and second slide rail assemblies when the cable management assembly is in a retracted position, and the second end of the supporting member is rotatable about the first end of the supporting member, and said supporting member is configured for supporting at least one of the first cable management bracket and the second cable management bracket; and
an actuator connected to the supporting member adjacent the free second end of the supporting member and positioned upright with respect to the main body of the supporting member so that the actuator is positioned between the first cable management bracket and the second cable management bracket;
wherein upon relative displacement of the first cable management bracket and the second cable management bracket, one of the first cable management bracket and the second cable management bracket drives the supporting member to rotate relative to the supporting base.

* * * * *